United States Patent
Kim

(10) Patent No.: US 10,480,397 B2
(45) Date of Patent: Nov. 19, 2019

(54) SYSTEM AND METHOD FOR CONTROLLING VARIABLE TURBOCHARGER

(71) Applicants: HYUNDAI MOTOR COMPANY, Seoul (KR); KIA MOTORS CORPORATION, Seoul (KR)

(72) Inventor: Young Min Kim, Yongin-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 596 days.

(21) Appl. No.: 14/936,056

(22) Filed: Nov. 9, 2015

(65) Prior Publication Data
US 2017/0016391 A1    Jan. 19, 2017

(30) Foreign Application Priority Data
Jul. 14, 2015   (KR) .......................... 10-2015-0099720

(51) Int. Cl.
| | | |
|---|---|---|
| *F02B 37/24* | (2006.01) | |
| *F02D 41/24* | (2006.01) | |
| *F02M 26/04* | (2016.01) | |
| *F02D 35/00* | (2006.01) | |
| *F02D 41/14* | (2006.01) | |
| *F02D 41/00* | (2006.01) | |

(52) U.S. Cl.
CPC .......... *F02B 37/24* (2013.01); *F02D 35/0007* (2013.01); *F02D 41/1448* (2013.01); *F02D 41/2438* (2013.01); *F02D 41/2464* (2013.01); *F02M 26/04* (2016.02); *F02D 41/0055* (2013.01); *Y02T 10/144* (2013.01)

(58) Field of Classification Search
CPC ....... F02B 37/22; F02B 37/24; F02D 41/1448
USPC ........................................... 60/602; 701/102
See application file for complete search history.

(56) References Cited

U.S. PATENT DOCUMENTS

| | | | | |
|---|---|---|---|---|
| 4,490,622 A | * | 12/1984 | Osborn | ................... F01D 25/16 290/2 |
| 2007/0209361 A1 | * | 9/2007 | Pedersen | ................. F01D 9/026 60/602 |

(Continued)

FOREIGN PATENT DOCUMENTS

| | | |
|---|---|---|
| JP | 2005-330811 | 12/2005 |
| JP | 2010-223036 | 10/2010 |

(Continued)

OTHER PUBLICATIONS

Machine generated translation for KR 1020130000170 A obtained from epo.org.*

(Continued)

*Primary Examiner* — Ngoc T Nguyen
(74) *Attorney, Agent, or Firm* — Brinks Gilson & Lione

(57) ABSTRACT

A system for controlling a variable turbocharger includes: a first controller outputting a duty value for adjusting an opening degree of a vane of a turbocharger, and a second controller checking opening or closing operations of the vane when the first controller adjusts the opening degree of the vane. In particular, the second controller outputs a corrected duty value by correcting the output duty value, based on a correction map, in consideration of a back pressure according to whether the vane is opened or closed.

4 Claims, 2 Drawing Sheets

(56) References Cited

U.S. PATENT DOCUMENTS

Figure 1:
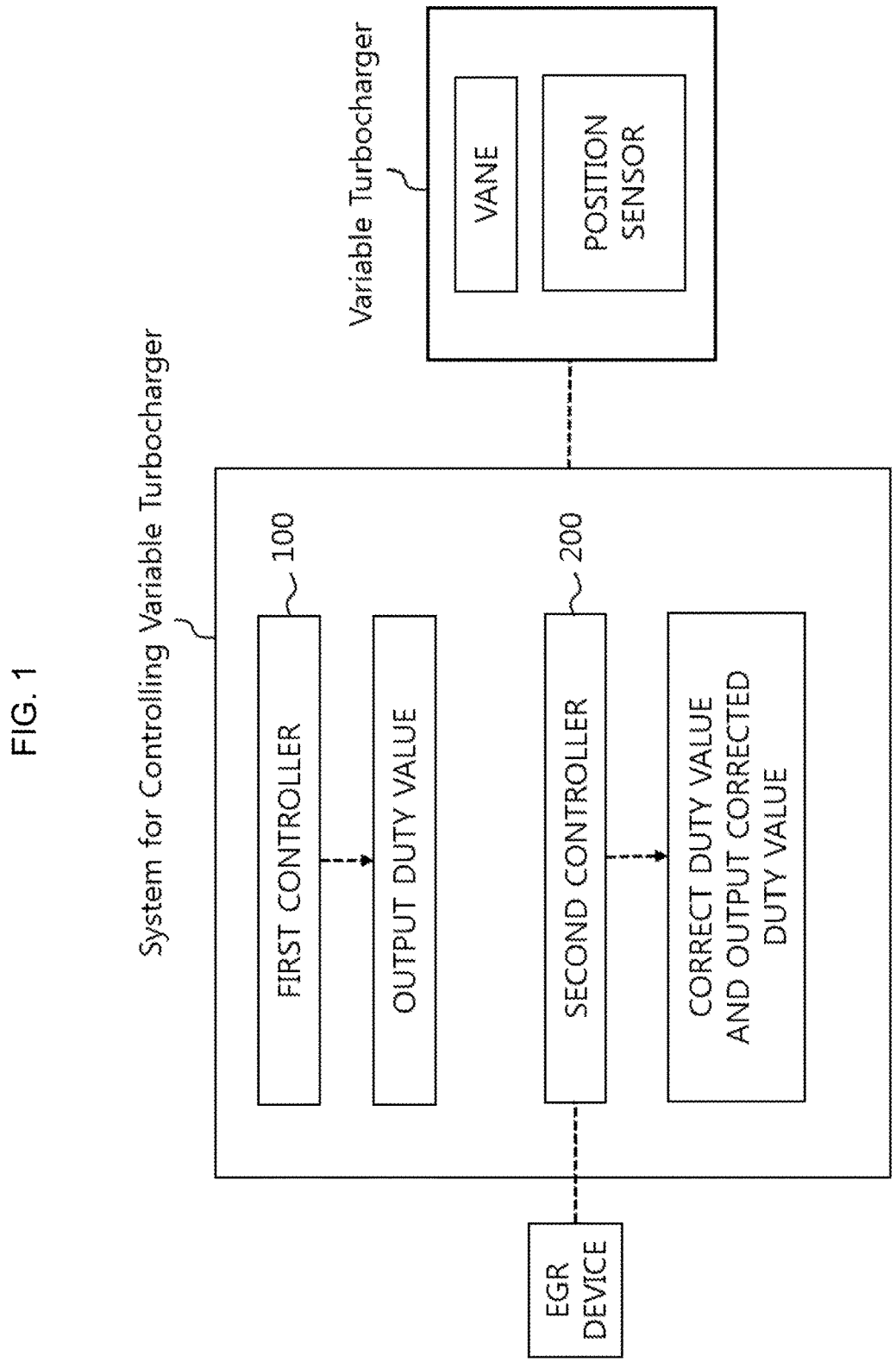

2011/0067680 A1* 3/2011 Williams ................ F02B 37/24
123/568.21
2013/0255648 A1* 10/2013 Yamamoto ............ F02B 37/225
123/559.1

FOREIGN PATENT DOCUMENTS

| KR | 10-2009-0062660 A | 6/2009 |
| KR | 10-2010-0052808 A | 5/2010 |
| KR | 10-2013-0000170   | 1/2013 |

OTHER PUBLICATIONS

Machine generated translation for JP 2005330811 A obtained from epo.org.*

* cited by examiner

SYSTEM AND METHOD FOR CONTROLLING VARIABLE TURBOCHARGER

CROSS-REFERENCE TO RELATED APPLICATION

The present application claims the benefit of the Korean Patent Application No. 10-2015-0099720, filed Jul. 14, 2015, which is incorporated herein by reference in its entirety.

FIELD

The present disclosure relates to a system and method for controlling a variable turbocharger.

BACKGROUND

The statements in this section merely provide background information related to the present disclosure and may not constitute prior art.

As the number of vehicles having high power and low fuel efficiency has recently increased, variable geometric turbochargers (VGTs) for improving the performance of vehicles are applied to the vehicle. Such a variable geometric turbocharger is configured to control the opening position of each vane provided in a turbine, and the position of the vane is determined according to the boost pressure required for vehicle traveling, based on an air pressure, an amount of fuel injection, an engine RPM, and the like through an engine control unit (ECU).

The variable geometric turbocharger allows the vane to be closed in a low speed region so as to increase the velocity energy of exhaust gas and the charging efficiency of suction air, whereas it allows the vane to be opened in a high speed region so as to reduce the velocity energy of exhaust gas as an exhaust flow rate is increased.

However, in the conventional variable geometric turbocharger, carbon is accumulated in the vane, or the rotation of the vane fails when the turbocharger is used for a long time, thereby causing the opening position of the vane to be not exactly set according to the duty value of an actuator which adjusts the position of the vane.

Moreover, we have discovered that high-pressure exhaust gas flows in the variable geometric turbocharger, but a back pressure is not considered at all when the vane rotates. For this reason, the opening degree of the vane is not exactly adjusted due to the discharged back pressure.

The foregoing is intended merely to aid in the understanding of the background of the present disclosure, and is not intended to mean that the present disclosure falls within the purview of the related art that is already known to those skilled in the art.

SUMMARY

The present disclosure provides a system and method for controlling a variable turbocharger, which is capable of allowing each vane to rotate to an accurate position and to rapidly reach a target position by correcting the position deviation of the vane caused by a back pressure when the vane rotates.

In accordance with one aspect of the present disclosure, a system for controlling a variable turbocharger includes a first controller outputting a duty value for adjusting an opening degree of a vane of a turbocharger, and a second controller checking an opening or closing operation of the vane when the first controller adjusts the opening degree of the vane, and outputting a corrected duty value by correcting the output duty value, based on a correction map, in consideration of a back pressure according to whether the vane is opened or closed.

The first controller may pre-store an initial learning map, which stores a position of the vane according to the duty value, and check whether the position of the vane according to the duty value corresponds to that stored in the initial learning map while increasing and applying the duty value thereto.

When the position of the vane according to the increased and applied duty value does not correspond to that stored in the initial learning map, the duty value may be corrected to have a high value by the first controller, and the first controller may store a position of the vane according to the corrected increasing duty value in the initial learning map.

The second controller may check an operating condition of an exhaust gas recirculation (EGR) device according to an engine RPM, and correct the duty value output from the first controller on the basis of the correction map when the engine RPM satisfies the operating condition of the exhaust gas recirculation device.

When the vane is opened, the duty value output from the first controller may be corrected to have a low value on the basis of the correction map by the second controller. On the other hand, when the vane is closed, the duty value may be corrected to have a high value by the second controller.

In accordance with another aspect of the present disclosure, a method for controlling a variable turbocharger includes performing a first process of outputting a duty value for adjusting an opening degree of a vane of a turbocharger, performing a second process of checking whether the vane is opened or closed when the opening degree of the vane is adjusted, and performing a third process of outputting a corrected duty value by correcting the output duty value, based on a prepared correction map, in consideration of a back pressure according to whether the vane is opened or closed.

The method may further include performing a correction learning process of checking whether a position of the vane according to the duty value corresponds to a position of the vane according to an initial duty value, which is stored in an initial learning map, while the duty value is increased and applied before the performing a first process.

When the position of the vane according to the increased and applied duty value does not correspond to that stored in the initial learning map, the duty value may be corrected to have a high value by the performing a correction learning process, and the position of the vane according to the corrected increasing duty value may be stored in the initial learning map, and the performing a first process may output a duty value for adjusting the opening degree of the vane, based on the duty value which is corrected to have a high value through the performing a correction learning process.

The performing a first process may further include performing a back-pressure correction check process of checking an operating condition of an exhaust gas recirculation (EGR) device according to an engine RPM and of allowing the performing a second process to be performed when the engine RPM satisfies the operating condition of the exhaust gas recirculation device.

When the vane is opened, the duty value output from the performing a first process may be corrected to have a low value on the basis of the correction map by the performing a second process. On the other hand, when the vane is closed, the duty value may be corrected to have a high value by the performing a second process.

As apparent from the above description, according to the system and method for controlling a variable turbocharger having the above-mentioned structure, the vane can rotate to the exact position by correcting the position deviation of the vane caused by the back pressure when the vane rotates.

In addition, since the vane rapidly reaches the target position, the traveling performance of a vehicle can be enhanced through improved response for acceleration.

Further areas of applicability will become apparent from the description provided herein. It should be understood that the description and specific examples are intended for purposes of illustration only and are not intended to limit the scope of the present disclosure.

DRAWINGS

Figure 2:
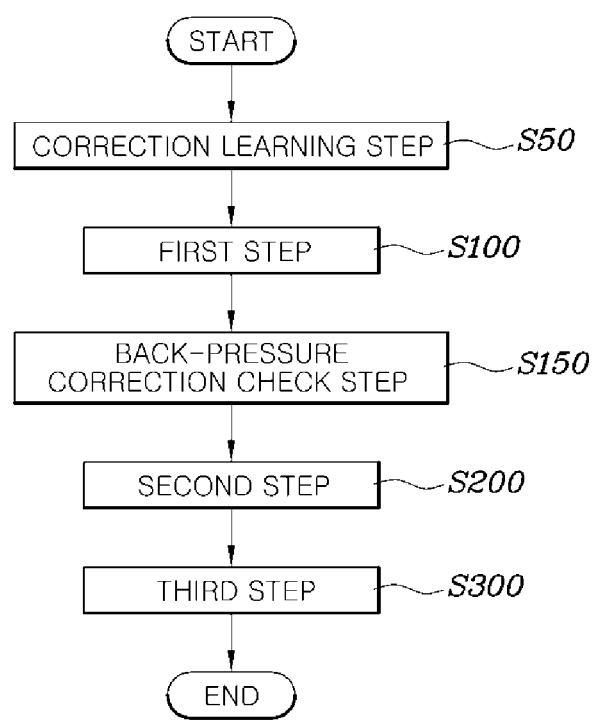

In order that the disclosure may be well understood, there will now be described various forms thereof, given by way of example, reference being made to the accompanying drawings, in which:

FIG. 1 is a diagram illustrating the configuration of a system for controlling a variable turbocharger according to the present disclosure; and FIG. 2 is a flowchart illustrating a method for controlling a variable turbocharger according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In general, a variable turbocharger includes a plurality of vanes which are rotatably installed in a turbine to adjust the flow cross section of exhaust gas, an actuator which is operated to adjust the angles of rotation of the vanes, a position sensor for detecting the position angles of the vanes, a solenoid module which adjusts a working pressure supplied to the actuator, and a control unit which drives the actuator to rotate the vanes installed in the turbine.

Here, the control unit may control the installation angles of the vanes in a feedback manner by checking the angles of the vanes through the position sensor and using PID control to change the duty value of the solenoid module.

In particular, the present disclosure corrects a duty value when adjusting the position of each of the vanes so that the vane is accurately and rapidly located at a target position. To this end, the system for controlling a variable turbocharger according to the embodiment of the present disclosure includes a first controller 100 which outputs a duty value for adjusting the opening degree of each vane of a turbocharger, and a second controller 200 which checks the opening or closing operation of the vane when the first controller 100 adjusts the opening degree of the vane, and outputs a corrected duty value by correcting the output duty value, based on a correction map, in consideration of a back pressure according to whether the vane is opened or closed.

That is, the present disclosure outputs a duty value for adjusting the opening degree of the vane through the first controller 100. The first controller 100 outputs a duty value according to the position of the vane of the turbocharger, which is determined based on an air pressure, an amount of fuel injection, an engine RPM, and the like, so that the vane rotates to a proper position according to the traveling state of a vehicle.

Here, the present disclosure corrects the duty value output from the first controller 100 in consideration of the back pressure using the second controller 200, and outputs a corrected duty value. That is, high-pressure exhaust gas flows in the variable turbocharger. In this case, the vane may not be exactly moved to a set position because the back pressure, which is generated by the flow of the exhaust gas, has an influence on the rotation of the vane. Accordingly, the second controller 200 corrects the output duty value, based on the prepared correction map, in consideration of the back pressure, such that the vane rotates to a proper position.

In detail, the second controller 200 receives the duty value output from the first controller 100, and checks whether the vane is opened or closed. Here, the opening or closing operation of the vane may be checked by comparing the current position of the vane with the position of the vane which should be changed according to the current traveling state of the vehicle. By checking whether the vane is opened or closed, it is determined whether to further increase the duty value and apply the increase duty value to the second controller since the vane has to rotate against the back pressure of exhaust gas when the vane is closed during the flow of the exhaust gas. On the contrary, since the vane is pushed by the back pressure of exhaust gas when being opened, the vane may be moved to a set position even though the duty value is decreased.

Thus, the present disclosure checks whether the vane is opened or closed and corrects the duty value in consideration of the back pressure.

Meanwhile, the second controller 200 includes a correction map for the correction of the duty value. The correction map previously measures the back pressure of exhaust gas in the turbocharger according to the engine RPM through experiments, and stores correction values for correcting the duty value corresponding thereto in a database. Moreover, the correction map may calculate and store respective correction values with respect to the opening and closing operations of the vane in consideration of the back pressure, thereby determining a correction value for allowing the vane to be located at a desired position according to whether the vane is opened or closed.

The second controller 200 of the present disclosure checks the opening or closing operation of the vane for adjusting the opening degree of the vane, and outputs the corrected duty value by correcting the output duty value, based on the correction map, according to whether the vane is opened or closed. Here, when the vane is opened, a force is applied in the opening direction of the vane by the flow of the exhaust gas. Therefore, the duty value, which is output from the first controller 100, is corrected to have a low value (i.e., the duty value is decreased) on the basis of the correction map by the second controller 200, and thus the vane may not be excessively rotated beyond a set position so as to be exactly followed and located at the set position.

On the other hand, when the vane is closed, a reaction force is applied in the rotating direction of the vane by the flow of the exhaust gas. Therefore, the duty value is corrected to have a high value on the basis of the correction map, thereby enabling the vane to be rapidly and exactly located at the set position.

Meanwhile, the present disclosure resolves a deviation caused by a single component, which changes the position of the vane, together with the correction of the duty value in consideration of the back pressure, so that the vane may be more exactly moved to the set position.

To this end, the first controller 100 may prestore an initial learning map which stores the position of the vane according to the duty value, and check whether the position of the vane according to the duty value corresponds to that stored in the initial learning map while increasing and applying the duty value thereto.

Here, the initial learning map stored in the first controller 100 stores the position of the vane according to the latest corrected duty value. In order to resolve the position deviation caused by the single component for rotating the vane, the first controller 100 checks the position of the vane while increasing and applying the duty value thereto, and compares the checked position with that stored in the initial learning map so as to identify a difference therebetween.

If the position of the vane according to the increased and applied duty value is identified to correspond to that stored in the initial learning map, the first controller 100 determines that vane components are normally operated without the operation errors therebetween and outputs a duty value, which is not corrected, for rotating the vane to a set position.

On the other hand, if the position of the vane according to the increased and applied duty value does not correspond to that stored in the initial learning map, the duty value is corrected to have a high value (i.e., the duty value is increased) by the first controller 100 so that the vane is located at the set position. That is, when the position of the vane according to a specific duty value does not correspond to that stored in the initial learning map, it is necessary to increase the duty value due to the friction loss of the actuator or the vane so that the vane may reach the set position. Therefore, the duty value is corrected to have a high value.

Moreover, the position of the vane according to the corrected increasing duty value is stored in the initial learning map, and a duty value which is later changed according to the position of the vane, is corrected based on the initial learning map. Thereby, the duty value required to follow the set position of the vane may be properly derived and applied.

Meanwhile, the second controller 200 may check the operating condition of an exhaust gas recirculation (EGR) device according to an engine RPM, and correct the duty value output from the first controller 100 on the basis of the correction map when the engine RPM satisfies the operating condition of the exhaust gas recirculation device.

That is, the exhaust gas recirculation device is driven according to the engine RPM. Here, in the engine RPM in which the exhaust gas recirculation device is not driven, the back pressure of discharged exhaust gas has less influence on the rotation of the vane. Therefore, the second controller 200 does not correct the duty value output from the first controller 100.

Accordingly, since the back pressure of exhaust gas has an influence on the rotation of the vane when the operating condition of the exhaust gas recirculation device is satisfied, the second controller 200 corrects the duty value output from the first controller 100 on the basis of the correction map.

Meanwhile, the method for controlling a variable turbocharger includes a first step S100 of outputting a duty value for adjusting the opening degree of each vane of a turbocharger, a second step S200 of checking whether the vane is opened or closed when the opening degree of the vane is adjusted, and a third step S300 of outputting a corrected duty value by correcting the output duty value, based on a prepared correction map, in consideration of a back pressure according to whether the vane is opened or closed.

The first step S100 may output the duty value, the second step S200 may check whether the vane is opened or closed, and the third step S300 may correct the duty value in consideration of the back pressure according to the rotation of the vane so that the vane rotates to an exact position.

That is, high-pressure exhaust gas flows in the variable turbocharger. In this case, the vane may not be properly moved to a set position because the back pressure, which is generated by the flow of the exhaust gas, has an influence on the rotation of the vane. Accordingly, the duty value is corrected based on the prepared correction map in consideration of the back pressure, thereby enabling the vane to rotate to an exact position.

In detail, when the vane is opened, a force is applied in the opening direction of the vane by the flow of the exhaust gas. Therefore, the duty value, which is output from the first step S100, is corrected to have a low value (i.e., the duty value is decreased) on the basis of the correction map, and thus the vane may not be excessively rotated beyond a set position so as to be exactly followed and located at the set position.

On the other hand, when the vane is closed, a reaction force is applied in the rotating direction of the vane by the flow of the exhaust gas. Therefore, the duty value is corrected to have a high value (i.e., the duty value is increased) on the basis of the correction map, thereby enabling the vane to be rapidly and accurately located at the set position.

Meanwhile, the method further includes a correction learning step S50 of checking whether the position of the vane according to the duty value corresponds to the position of the vane according to the initial duty value, which is stored in an initial learning map, while the duty value is increased and applied before the first step S100.

When the position of the vane according to the increased and applied duty value does not correspond to that stored in the initial learning map, the duty value is corrected to have a high value by the correction learning step S50 and the position of the vane according to the corrected increasing duty value is stored in the initial learning map. The first step S100 may output a duty value for adjusting the opening degree of the vane, based on the duty value which is corrected to have a high value through the correction learning step S50.

That is, when the position of the vane according to the increased and applied duty value through the correction learning step S50 does not correspond to that stored in the initial learning map, it is necessary to increase the duty value due to the friction loss of the actuator or the vane so that the vane may reach the set position. Therefore, the duty value is corrected to have a high value such that the vane is exactly located at the set position.

Meanwhile, the first step S100 further includes a back-pressure correction check step S150 of checking the operating condition of an exhaust gas recirculation (EGR) device according to an engine RPM and performing the second step S200 when the engine RPM satisfies the operating condition of the exhaust gas recirculation device.

That is, the exhaust gas recirculation device is driven according to the engine RPM. Here, in the engine RPM in which the exhaust gas recirculation device is not driven, the back pressure of discharged exhaust gas has less influence on the rotation of the vane. Therefore, the third step S300 does not correct the duty value.

Accordingly, it is determined that the back pressure of exhaust gas has an influence on the rotation of the vane when the operating condition of the exhaust gas recirculation device is satisfied. Therefore, the back-pressure correction check step S150 corrects the duty value output from the first step S100 on the basis of the correction map.

In accordance with the system and method for controlling a variable turbocharger having the above-mentioned structure, the vane can rotate to the exact position by correcting the position deviation of the vane caused by the back pressure when the vane rotates.

In addition, since the vane rapidly reaches the target position, the traveling performance of the vehicle can be enhanced through improved response for acceleration.

Although the embodiments of the present disclosure have been disclosed for illustrative purposes, those skilled in the art will appreciate that various modifications, additions and substitutions are possible, without departing from the scope and spirit of the present disclosure as disclosed in the accompanying claims.

What is claimed is:

1. A system for controlling a variable turbocharger, comprising:
    a first controller configured to output a duty value adjusting an opening degree of a vane of a turbocharger; and
    a second controller configured to check whether the vane is in an opening or a closing operation when the first controller adjusts the opening degree of the vane, and configured to output, based on a back pressure generated by flow of exhaust gas and whether the vane is opened or closed, a corrected duty value by which the output duty value is corrected based on a correction map,
    wherein the correction map is a map for previously measured back pressure of exhaust gas in the turbocharger based on an engine revolutions per minute (RPM) through experiments, and for storing correction values for correcting the duty value corresponding thereto in a database,
    wherein the first controller is configured to prestore an initial learning map which stores a target position of the vane based on the duty value, and check whether a present position of the vane based on the duty value corresponds to the target position of the vane stored in the initial learning map using a position sensor while increasing and applying a predetermined value to the duty value if the present position of the vane based on the duty value differs from the target position,
    wherein the initial learning map is a map that stores the position of the vane based on a latest corrected duty value,
    wherein when the vane is opened, the duty value output from the first controller is corrected to decrease a predetermined value based on the correction map by the second controller, and,
    wherein when the vane is closed, the duty value output from the first controller is corrected to increase a predetermined value based on the correction map by the second controller.

2. The system according to claim 1, wherein, when the position of the vane according to the increased and applied duty value does not correspond to the target position of the vane stored in the initial learning map, the duty value is corrected to increase a predetermined value by the first controller, and the first controller overwrites a position of the vane according to the corrected increasing duty value in the initial learning map.

3. A method for controlling a variable turbocharger, comprising:
    performing by a first controller a first process of outputting a duty value adjusting an opening degree of a vane of a turbocharger;
    performing by a second controller a second process of checking whether the vane is opened or closed when the opening degree of the vane is adjusted; and
    performing by the second controller a third process of outputting a corrected duty value by which the output duty value is corrected, based on a prepared correction map, based on a back pressure, which is generated by flow of exhaust gas, according to whether the vane is opened or closed,
    wherein the correction map is a map for previously measured back pressure of exhaust gas in the turbocharger according to an engine revolutions per minute (RPM) through experiments, and for storing correction values for correcting the duty value corresponding thereto in a database; and
    performing a correction learning process of checking whether a present position of the vane according to the duty value corresponds to a target position of the vane according to an initial duty value using a position sensor, which is stored in an initial learning map, while a predetermined value is increased and applied to the duty value before the performing the first process if the present position of the vane according to the duty value differs from the target position,
    wherein the initial learning map is a map that stores the position of the vane according to latest corrected duty value,
    wherein when the vane is opened, the duty value output from the first process is corrected to decrease a predetermined value based on the correction map by the performing the second process, and
    wherein when the vane is closed, the duty value output from the first process is corrected to increase a predetermined value based on the correction map by the performing the second process.

4. The method according to claim 3, wherein:
    when the present position of the vane according to the increased and applied duty value does not correspond to a target position of the vane stored in the initial learning map, the duty value is corrected to increase a predetermined value by performing the correction learning process, and the position of the vane according to the corrected increasing duty value is overwritten in the initial learning map; and
    the first process is performed based on the duty value which is corrected to increase the predetermined value through the correction learning process.

* * * * *